Feb. 12, 1952     B. VONNEGUT ET AL     2,585,604
ROTATING DISK ICING RATE METER
Filed Aug. 17, 1950     3 Sheets-Sheet 1
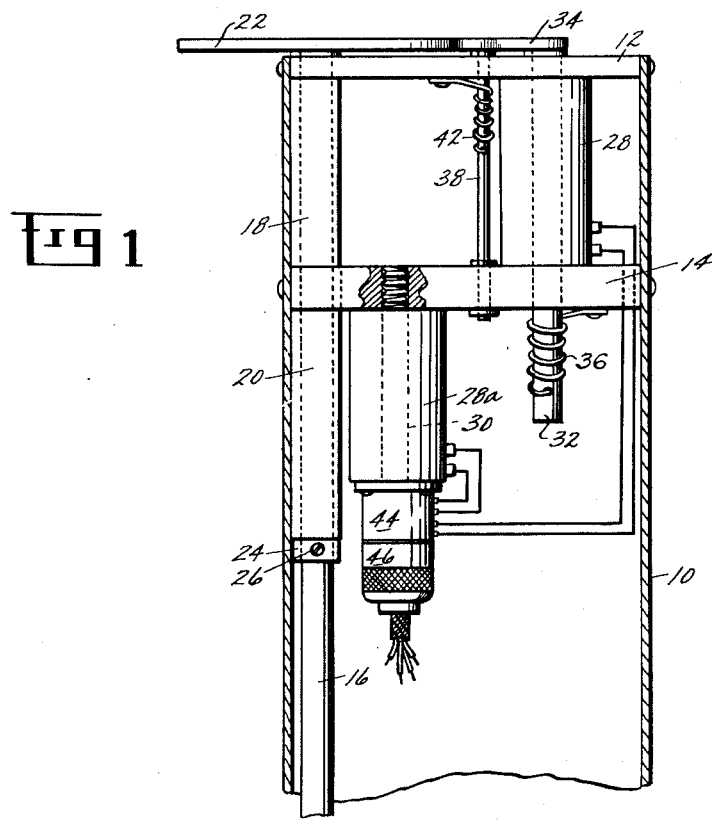
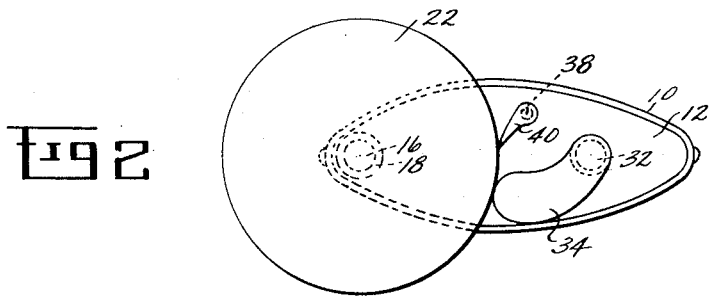
INVENTORS.
BERNARD VONNEGUT
ROBERT E KATZ

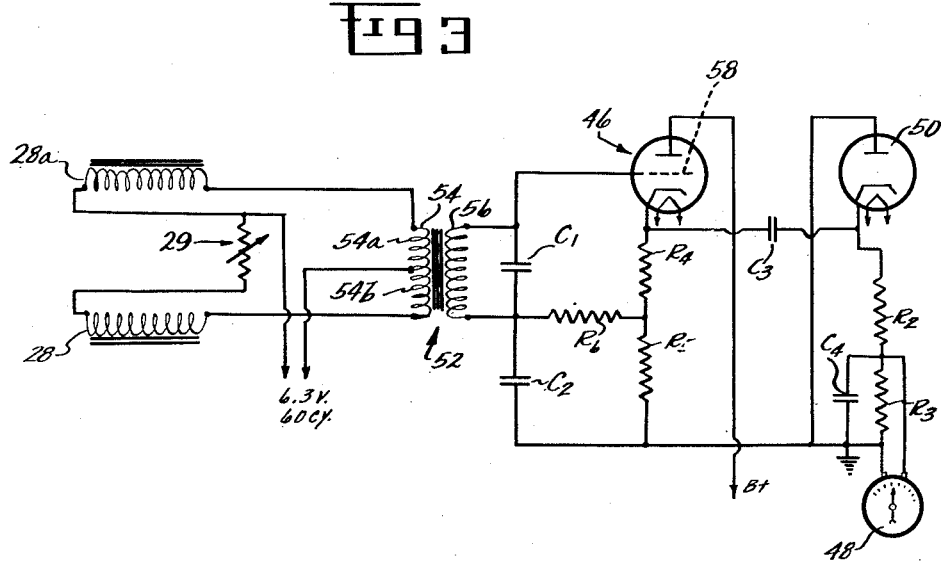
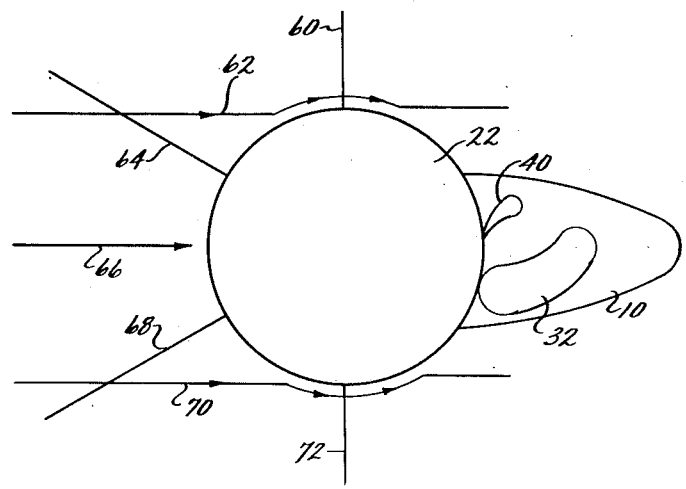

ROTATING DISC-RATE OF ICING METER

INVENTORS.
BERNARD VONNEGUT
ROBERT E. KATZ ial length of the magnetic circuit is reflected in a change

UNITED STATES PATENT OFFICE 2,585,604

ROTATING DISK ICING RATE METER

Bernard Vonnegut, Alplaus, N. Y., and Robert E. Katz, Washington, D. C., assignors to the United States of America as represented by the Secretary of the United States Air Force Application August 17, 1950, Serial No. 179,974

4 Claims. (Cl. 33—143)

The invention described herein may be manufactured and used by or for the United States Government for governmental purposes without payment to us of any royalty thereon.

This invention relates to equipment for determining the rate at which ice is forming on the leading surfaces of an aircraft and comprises means for continuously measuring the ice accretion during a selected period of time and visibly recording the thickness accured during that period.

Briefly the device is of that type which employs a continuously rotating disc mounted for slow rotation, preferably about two r.p.m., on an axis transverse to the air stream, the leading edge of the disc cutting the air stream and accumulating ice when icing conditions prevail, the trailing edge of the disc being provided with cutter means to remove the ice accumulated in the half revolution of the disc after its thickness has been measured. A measuring feeler is provided for yieldable contact with the perimeter of the disc at the trailing edge and is positioned to be raised off the edge of the disc by the accumulated ice coating. A winding is provided to create a magnetic circuit in which both the disc and the feeler are included. Both the disc and the feeler are of magnetic material whereby the thicker the ice accumulation the greater the gap in the magnetic circuit. Change in the physical length of the magnetic circuit is reflected in a change in impedance to an alternating current of the electrical winding.

This change in impedance is measured by placing the above-mentioned winding in a simple electrical bridge circuit supplied with a sixty cycle alternating voltage. The off balance of the bridge is a function of the thickness of the ice between the feeler arm and the disc and this is amplified by a vacuum tube amplifier and read on a recording meter.

An object of the invention is to provide a device of this character which is simple in construction and of relatively low cost in production and highly sensitive in its result without requiring undue accuracy in the structural details.

We attain these and other objects and advantages by means of the structure hereinafter shown and described with reference to the drawings in which:

Fig. 1 is a top plan view of a simple embodiment of our invention.

Fig. 2 is an end view of Fig. 1.

Fig. 3 is a diagram of the amplifying and recording circuit.

Fig. 4 shows the collection efficiency of the device.

Like reference characters refer to like parts throughout the several views.

Figure 5:
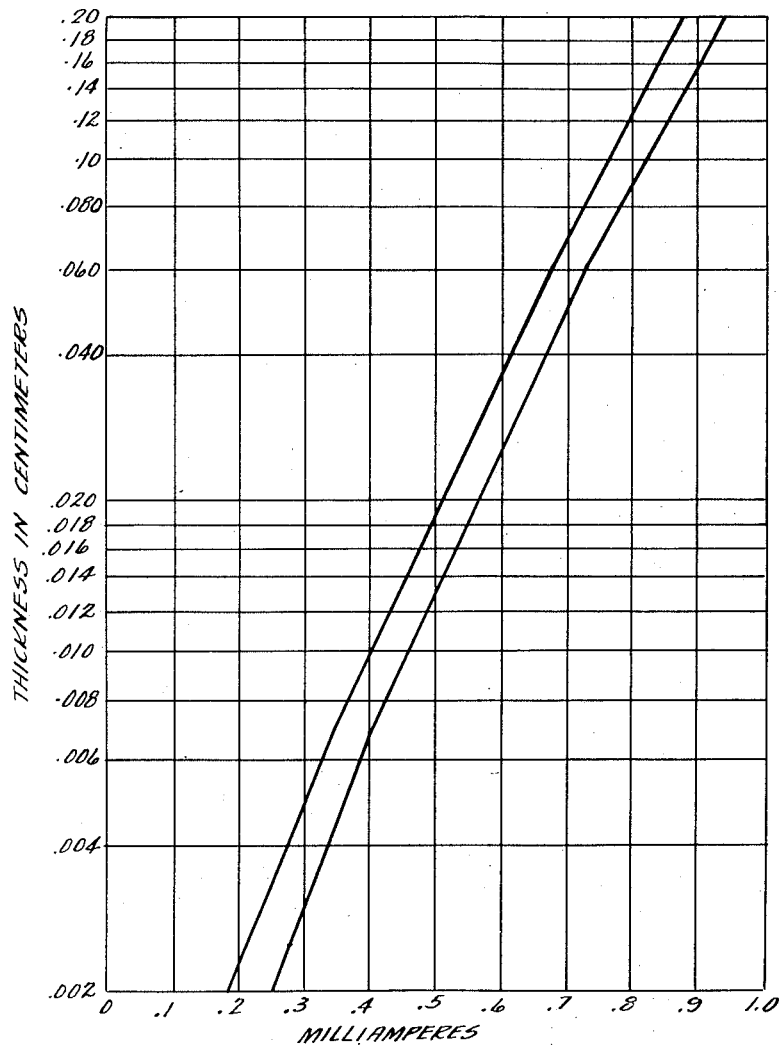
Fig. 5 shows a chart used for calibrating the instrument shown.

Referring more particularly to Fig. 1, a hollow sheet aluminum mast 10 of airfoil cross section is supported on the outer surface of an aircraft. A header 12 closes the outer end of the mast and a partitioning member 14 is longitudinally spaced therefrom. Header 12 and partitioning member 14 are made of nonmagnetic material and ferrous material, respectively, for reasons which will later appear. A shaft 16 is rotatable in bearings 18 and 20 which are supported in the mast near its leading edge. A disc 22 which may be from one thirty-second to one-eighth inch thick is integral with the shaft 16 or may be welded or otherwise secured thereto. The rim of the disc should be hardened and polished around the periphery. The shaft extends throughout the length of the mast and into the inside of the fuselage were it is connected to and arranged to be driven by an electric motor (not shown). A collar 24 is held in place at the end of bearing 20 by a screw 26 to restrain the shaft 16 against axial movement.

An electromagnetic coil 28 is mounted between header 12 and partition 14. A like coil 28a is mounted on the inner side of the partition 14. Coil 28a is mounted on an iron core 30 which depends for its support on its threaded engagement with partition 14. Coil 28 rotatably receives an iron rockshaft 32 which serves also as a core for the coil 28 and at its outer end, extends through and slightly beyond the header 12, and, at its inner end, extends through and beyond the partition 14. A feeler arm 34 is integral with or attached to the outer end of the rockshaft 32 and a torsion spring 36 on the projecting inner end has one end fast on the rockshaft and the other end fast on the partition 14. Spring 36 is stressed to maintain the swingable feeler arm in yieldable contact with the perimeter of the disc 22.

A small rockshaft 38 lies parallel to the rockshaft 32 and has bearing in the header 12 and partition 14. This rockshaft 38 extends through and beyond the header 12 and at the outer end carries a cutter member 40. A torsion spring 42 has one end fast on the shaft 38 and the other end fast on the header 12. The torsion spring 42 is stressed to apply a predetermined torque to maintain the edge of the cutter 40 in yieldable contact with the edge of the disc 22.

A terminal block 44 supplies current to the coils and a connector 46 electrically connects the source of current supply to the connector.

It will be noted that the partition member 14, shaft 16, bearing 18, disc 22, feeler 34 and shaft 32 form a complete rectangular magnetic circuit. Any separation of the feeler 34 from contact with the disc 22 due to collection of ice on the disc 22 will introduce an air gap in the magnetic circuit so that the reluctance of the magnetic circuit will vary in accordance with the dimensions of the air gap. It will accordingly be apparent that the impedance of the coil 28 to the flow of alternating current therethrough will change as a function of the variation in the magnetic circuit air gap.

One means (not shown) for measuring the change in impedance of the coil 28 with the change in the reluctance of the magnetic circuit is to connect the coils 28 and 28a as two arms of an impedance Wheatstone bridge with suitable resistors as the other two arms. By supplying a suitable constant voltage alternating current across a diagonal of the bridge a recording milliammeter may be connected through a rectifier across the other diagonal of the bridge to record current flow as a result of any bridge unbalance. An arrangement of this sort has the disadvantage of requiring an alternating current supply voltage of sixty to seventy volts at sixty cycle frequency which causes heating in the coils and accordingly a shift in calibration with change in temperature and further a constant supply voltage is required.

An improved impedance measuring circuit is disclosed in Fig. 3 in which the inductance coils 28 and 28a may be each wound of 2000 turns of No. 30 enamelled copper wire and arranged in an impedance measuring bridge with a zeroing adjustable resistance 29 and the other two arms of the bridge being formed by the windings 54a and 54b of the center tapped primary 54 of a step up transformer generally indicated at 52. A suitable alternating current of low voltage is connected across the center tap of the transformer primary 54 and the common connection of the coils 28 and 28a. Any deviation from exact opposition in phase and magnitude of the currents in the two halves 54a and 54b of the primary results in a signal being transmitted to the high impedance secondary 56. This signal is fed to the grid 58 of the vacuum tube 46 arranged as a cathode follower stage, the amplified output of which is rectified by the vacuum tube 50 and operates the Esterline-Angus recording milliammeter 48.

Since the cathode-follower stage operates with what amounts to 100% negative voltage feedback, its output is independent of supply voltage and tube variations. There is sufficient resistance in series with the rectifier tube 50 so that its output is substantially independent of changes in tube characteristics. There is no voltage gain in the cathode-follower stage, but this stage is in effect a power amplifier supplying a low impedance output signal to the rectifier from a high impedance input.

While it is true that the amplifier itself is substantially independent of supply voltage and tube variations, this does not apply to the bridge circuit. Since the output of an unbalanced bridge is being read, the absolute value of this output depends directly on the voltage of the input to the bridge. For this reason it is necessary to supply a constant A. C. voltage to the present instrument.

To calibrate the device, the zero setting may first be adjusted to a convenient value by means of resistor 29. This resistor increases the losses in the arm of the bridge containing the fixed coil 28 so that they are more nearly equivalent to those in the electrical and magnetic circuits of 28a.

While it has not been found possible with the above set-up to obtain an exact balance in both magnitude and phase, a minimum setting of 10 to 15% of full scale reading is readily obtainable.

It has been found desirable in some installations to split the trailing edge of the hollow aluminum mast for a distance of from three to four inches. This reduces eddy-current losses and results in a lower zero.

In operation, in order to obtain maximum sensitivity the resistor is adjusted somewhat past the minimum point. If this adjustment is made in the wrong direction, there will be slightly lower reading of the meter for the first few thousandths of an inch of motion of the feeler arm. As a result of this characteristic, it is easy to make the proper adjustment.

To calibrate the device after the zero setting has been made, a set of shims of nonmagnetic material such as brass, aluminum or plastic is used. The shims are inserted between the disc and the feeler arm so that they are tangent to both at the same spot, and readings are taken of the output. The shims are measured with a micrometer and the thickness can be plotted against the meter reading. A typical calibration is shown in Fig. 5. A typical calculation plotted on semi-logarithmic paper is substantially a straight line. This is a very desirable characteristic since it indicates that the percentage sensitivity at any point on the scale is approximately the same, and that a wide range of ice thickness can be covered on one scale.

It will be noted in the calibration in Fig. 5 that two different curves are given for two different temperatures. It has been found that a net temperature effect occurred even with both coils within the mast and subjected to the same temperature effects. However, with the electrical and magnetic circuits shown this temperature effect is such that the zero reading and the reading for any given thickness shift equally for the same temperature change, resulting in parallel calibration curves.

Since the zero setting is known before each icing run, this temperature effect causes only minor inconvenience.

The procedure whereby the instrument is calibrated by inserting nonmagnetic strips of various thickness under the feeler arm was hereinbefore described. The following discussion explains how the resultant readings of ice thickness are interpreted in terms of rate of ice formation, rate of water deposition, and liquid water content.

The following symbols may be used.

$T$ = indicated thickness of ice in cm.
$w$ = revolutions of disc per minute.
$e$ = density of ice deposited on disc.
$t$ = thickness of disc.
$r$ = radius of disc in cm.
$V$ = true air speed in mi./hr.
$E$ = average efficiency of collection of disc.
$Rw$ = rate of collection in g./hr.-cm.$^2$ of projected area on collector having 100% efficiency.
$LWC$ = liquid water content in gms./m.$^3$ The thickness of ice measured by the feeler may be related to the rate of collection of a 100% efficient collector. Any point on the edge of the disc collects ice for one-half revolution so that the time of exposure in minutes is $$\frac{1}{2w}$$

The ration of the projected area of the disc to the collecting area of the disc is $$\frac{2}{\pi}$$

Therefore, taking account of the density of ice and the efficiency of collection of the discs, the following relation may be stated.

$$T = \frac{Rw}{60} \times \frac{1}{2w} \times \frac{2}{\pi} \times \frac{1}{e} \times E$$

$$T = \frac{ERw}{60\pi ew} \text{ or } Rw = \frac{60\pi ewt}{E}$$

The liquid water content, LWC, may be determined by using the following expression:

$$LWC = \frac{6.2 Rw}{V} = \frac{1130 ewt}{EV}$$

The collection efficiency of the rotating disc 22 varies over different portions of the leading edge. Sufficient accuracy may be obtained by assuming a certain portion, as that subtended between radial lines 64 and 68, Fig. 4, as being a flat strip normal to the air stream 62, 66, 70. In this area the collecting efficiency is highest. The efficiency will drop off considerably as the air flows around the surface rather than over it as it does between lines 60 and 64 and between lines 68 and 72.

Data has been obtained on the collection efficiency of a one-eighth inch thick disc. The collection efficiency of the disc in flight was determined by comparison with rotating cylinder icing data taken at the same time. The data from the rotating disc instrument was interpreted on the assumption that the densiy of the ice deposited was 0.91 gms./cm.$^3$, which is the density of solid ice. This data, taken at 185 M. P. H. TAS, 2,500 ft. altitude at a temperature −9° C. with a liquid water content of 0.14 g./m.$^3$ and an average drop diameter of 9.1 microns, gave an efficiency for the disc of 69% as compared with 87% for the ⅛″ rotating cylinder and 36% for the 1″ rotating cylinder.

We claim:

1. A device for measuring the rate at which ice is forming on the leading surfaces of an aircraft, said device comprising, in combination, a hollow mast of airfoil cross section, a header of nonmagnetic material closing the outer end of said hollow mast, a transverse partition of magnetic material dividing the hollow of said mast into an outer and an inner chamber, an electromagnetic coil in the outer chamber with axis parallel with the mast axis, a core in said coil rockably supported, at the outer end, in said header and at the inner end in said partition, a second electromagnetic coil substantially like the first in the inner chamber with axis parallel to but offset with the axis of the first coil, a second core for said second coil fixedly supported in said partition, a shaft extending longitudinally in said mast axially parallel with said coils and through said header, bearings supported within said mast for said shaft, a disc fast on said shaft outside said header, a feeler arm fast on the first said core with the feeler end of the arm resting on the periphery of said disc, a cutter shaft rockable in bearings in said header and said partition and extending through and beyond said header, a cutter having one end fast on said cutter shaft and the other end brought to a sharp edge and resting on the periphery of said disc, a torque spring coiled around the first said core and having one end fast on the first said core and the other end fast on said partition, a second torque spring coiled around the cutter shaft and having one end fast on said cutter shaft and the other end fast on said header, in combination with a transformer, an amplifier, a rectifier, and a recording milliammeter, the said electromagnetic coils forming two arms of a bridge and the primary of the transformer being center tapped and connected to form the other two arms, and a resistor to balance the bridge, the output of the transformer being connected to the amplifier, the output of which is rectified by the rectifier and connected for operation of the recording milliammeter.

2. A device for measuring the rate at which ice is forming on the leading surfaces of an aircraft, said device comprising, in combination, a mast for attachment to the front of an aircraft, a shaft, bearings for said shaft carried by said mast, a disc of magnetic material fast on said shaft outside said mast, two identical electromagnetic coils in the mast, a core of magnetic material in one of said coils rockably supported in said mast, a second core of magnetic material fixedly supported within the other coil, a feeler arm of magnetic material fast on the first said core with the feeler end of the arm resting on the periphery of said disc near the trailing edge, a cutter shaft rockable in bearings in said mast, a cutter having one end fast on said cutter shaft and the other end brought to a sharp edge and resting on the periphery of said disc near the trailing edge, a torque spring coiled around the first said core and having one end fast on the first said core and the other end fast on said mast, a second torque spring coiled around the cutter shaft and having one end fast on said cutter shaft and the other end fast on said mast in combination with a transformer, an amplifier, a rectifier, and a recording milliammeter, the said electromagnetic coils forming two arms of a bridge and the primary of the transformer being center tapped and connected to form the other two arms, and a resistor to balance the bridge, the output of the transformer being connected to the amplifier, the output of which is rectified by the rectifier and connected for operation of the recording milliammeter.

3. A device for measuring the rate at which ice is forming on the leading surfaces of an aircraft, said device comprising, in combination, a shaft, a disc of magnetic material fast on one end of said shaft, bearings for rotatably supporting said shaft, an electromagnetic coil having axis parallel to the axis of said shaft, a core of magnetic material rotatable in said coil, a feeler arm fast on the end of said core with its swingable end resting on the edge of said disc, a knife having its cutting edge resting on the edge of said disc, spring means urging the swingable end of said feeler arm into contact with the edge of said disc, spring means urging said knife into contact with said disc, a second electromagnetic coil substantially like the first, a transformer, an amplifier, a rectifier, and a recording milliammeter, the said electromagnetic coils forming the two arms of a bridge and the primary of the transformer being center tapped and connected to form the other two arms, and a variable resistor to balance the bridge, the output of the transformer being electrically connected to the amplifier, the output of which is rectified by the rectifier and electrically connected for operation of the recording milliammeter.

4. A device for measuring the rate of ice accretion on leading surfaces of an aircraft comprising a driving shaft of magnetic material adapted to be rotated at a constant speed, a disc of magnetic material mounted on one end of said shaft and having its diameter parallel with the longitudinal axis of the aircraft, a yieldably mounted feeler of magnetic material adapted to contact the edge of said disc and to be displaced by ice collected over a portion of said disc, a scraper for removing ice from said disc after passage under the feeler, support means of magnetic material for supporting said shaft and feeler, said shaft, disc, feeler and said support means forming a magnetic circuit, a first coil associated with said magnetic circuit, a second inductance coil, means coupling said coils to form an impedance measuring bridge, means for energizing said bridge with alternating current and current indicating means coupled with said bridge for measuring the current output thereof in terms of the variation in reluctance of the said magnetic circuit due to accretion of ice on the edge of said disc.

BERNARD VONNEGUT.
ROBERT E. KATZ.

REFERENCES CITED

The following references are of record in the file of this patent:

UNITED STATES PATENTS

| Number | Name | Date |
| --- | --- | --- |
| 1,880,802 | Chilson | Oct. 4, 1932 |
| 2,171,450 | Langley | Aug. 29, 1939 |
| 2,427,778 | Gregg | Sept. 23, 1947 |